Oct. 27, 1964  N. T. GENERAL  3,153,910
HYDROKINETIC TORQUE CONVERTER UNIT WITH VARIABLE RANGE IMPELLER
Filed July 22, 1963  2 Sheets-Sheet 1
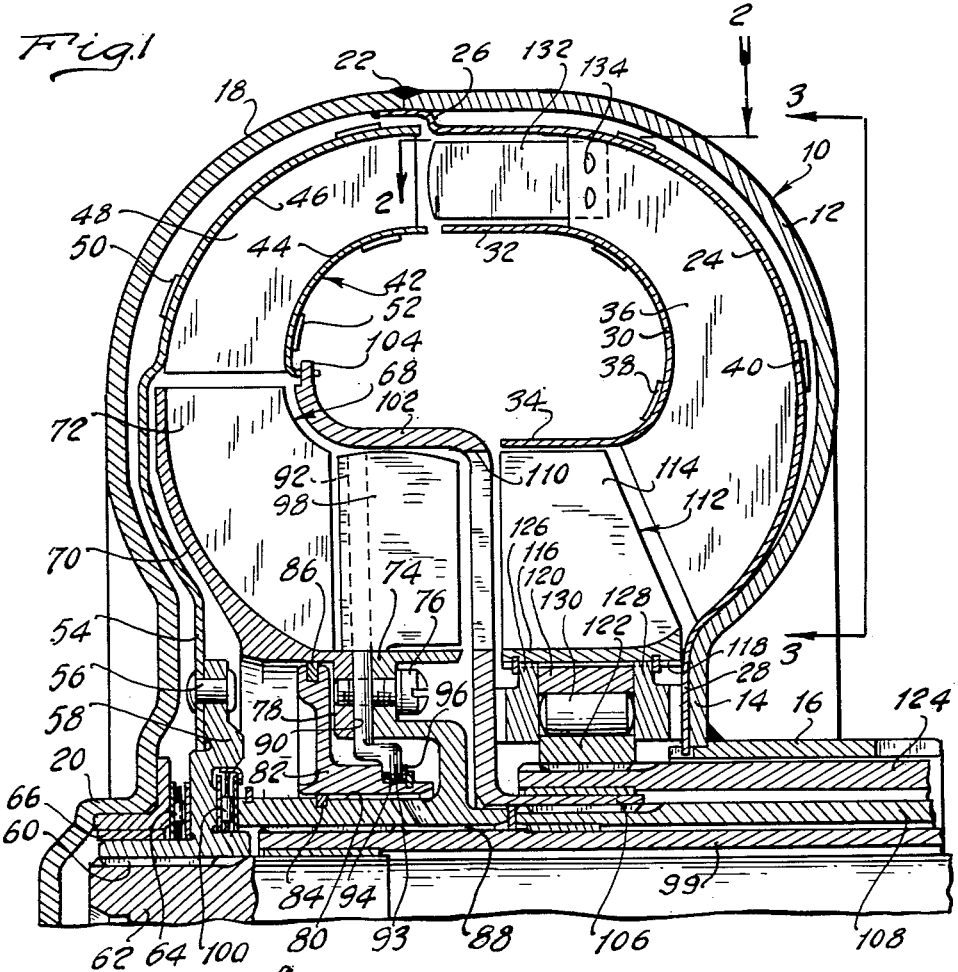
Fig.1
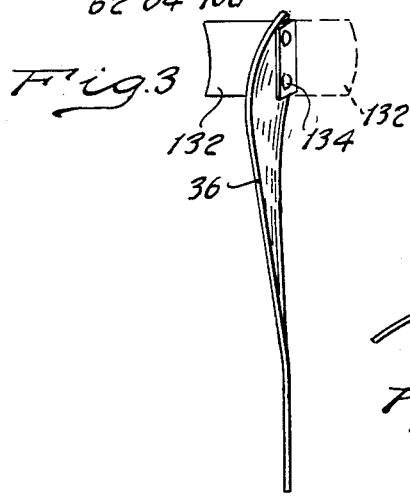
Fig.3
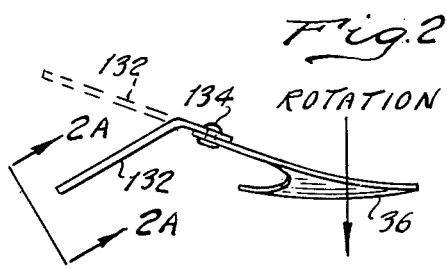
Fig.2
Fig.2A
INVENTOR:
NORMAN T. GENERAL
BY
ATTORNEYS

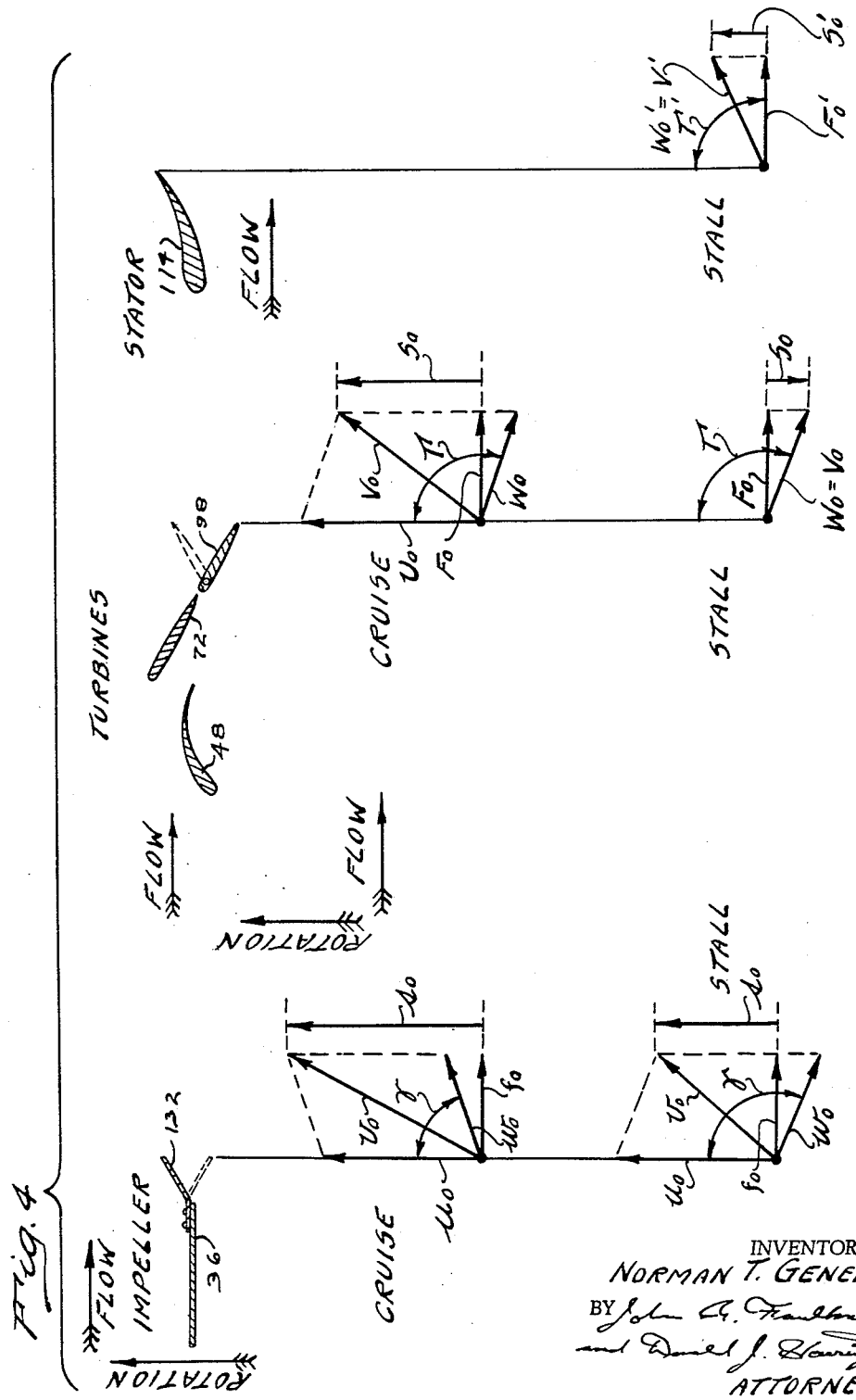

United States Patent Office 3,153,910
Patented Oct. 27, 1964

3,153,910
HYDROKINETIC TORQUE CONVERTER UNIT
WITH VARIABLE RANGE IMPELLER
Norman T. General, Orchard Lake, Mich., assignor to
Ford Motor Company, Dearborn, Mich., a corporation
of Delaware
Filed July 22, 1963, Ser. No. 296,727
2 Claims. (Cl. 60—54)

My invention relates generally to hydrokinetic torque converter mechanisms, and more particularly to a hydrokinetic torque converter mechanism having a bladed impeller wherein provision is made for altering the exit blade geometry of the impeller blades to provide optimum performance during operation in a low speed ratio range and high efficiency performance during operation in higher speed ratio and coupling ranges.

The structure of this disclosure is an improvement in the mechanism disclosed in U.S. Patent #3,083,589 which issued to James Knowles, Thomas R. Stockton and myself on April 2, 1963. It is an improvement also in the pending application of Martin G. Gabriel, Serial Number 167,071. The inventions of Knowles et al. and Gabriel are assigned to the assignee of my instant invention.

In a preferred form of my invention, I have provided a hydrokinetic torque converter unit having at least one turbine and an impeller situated in toroidal fluid flow relationship. The flow exit region of the impeller includes a series of flexible blade elements that are secured to the trailing edges of fixed impeller blades, and they cooperate with the fixed impeller blades to define the fluid flow passages of the impeller.

In a hydrokinetic torque converter mechanism of this type, the toroidal fluid flow velocity is of a relatively high value during operation at low speed ratios and at stall. The impeller blades are capable of increasing the tangential component of the absolute fluid flow velocity vector in the direction of rotation of the impeller, and this produces a hydrokinetic reaction force upon each of the impeller blades. It is because of this change in the direction of the fluid flow velocity vector and an increase in the operating radius of the fluid as it passes through the passages of the impeller that the moment of momentum of the fluid is increased before it enters the bladed passages of the turbine. The hydrokinetic reaction upon the flow exit region of the impeller blades causes the flexible elements of the blades to yield in a direction that is opposite to the direction of rotation of the impeller. This changes the effective blade geometry of the impeller blades and results in an increased size factor for the converter unit, the size factor being defined as the impeller speed divided by the square root of the impeller torque. As a result of this, the tangential component of the absolute fluid flow velocity vector at the exit region of the impeller is increased to a value that is greater than the value that would exist if the exit region of the impeller blades were inflexible. Thus at stall and during operation at low speed ratios, the overall torque ratio of the hydrokinetic unit is increased substantially.

During operation at high speed ratios and during coupling operation, the torus flow velocity decreases. The reaction force upon the impeller blades therefore decreases accordingly, and the flexible blade elements then will assume an angle that differs from the angle that they assume under high torus flow conditions. The flow that leaves the exit region of the impeller then will tend to be directed relative to the impeller blades in a tangential direction corresponding to the direction of rotation of the impeller. This then causes a substantial improvement in coupling efficiency of the torque converter unit.

The provision of a torque converter unit of the type above set forth being a principal object of my invention, it is a further object of my invention to provide a hydrokinetic torque converter unit wherein the size factor and torque ratio characteristics of the unit at any given speed ratio are dependent upon the torus flow velocity in the hydrokinetic circuit of the unit.

It is another object of my invention to provide a torque converter unit of the type above set forth wherein provision is made for improving the operating performance under low speed ratio conditions and the operating efficiency under high speed ratio conditions without the need for employing servo operated blade adjusting elements.

Further features and characteristics of my invention will become apparent from the following description and the accompanying drawings, wherein:

FIGURE 1 shows a cross-sectional assembly view of my improved torque converter mechanism;

FIGURE 2 is a detail view of a single blade of the impeller mechanism of the impeller of FIGURE 1, as viewed along the plane of section line 2—2 of FIGURE 1;

FIGURE 2A is an end view of the blade of FIGURE 2 taken along the plane of section 2A—2A of FIGURE 2;

FIGURE 3 is another detail view of a single blade of the impeller of FIGURE 1 taken along the plane of section line 3—3 of FIGURE 1; and FIGURE 4 is a vector diagram showing the characteristics of a particle of fluid as it traverses the torus circuit of the mechanism of FIGURE 1.

Referring first to FIGURE 1, the hydrokinetic torque converter mechanism is designated generally by reference character 10. It includes an impeller shell having a first shell part 12, which is formed with a toroidal shape to conform with the shape of the impeller blades. The radially inward portion 18 of the shell part 12 is secured by welding to a supporting sleeve shaft 16. This shaft in turn can be journalled in a conventional fashion within a suitable opening formed in a power transmission housing not shown. Patent #3,083,589 contains a description of a transmission housing and gearing arrangement that may be adapted to be used with the mechanism of FIGURE 1. Reference may be made to this patent to supplement my instant disclosure.

A second shell part shown at 18 includes a hub 20 that may be piloted within an engine driven crankshaft in the usual fashion. The shell part 18 also is formed with a toroidal shape and is welded at its outer periphery to the outer periphery of the shell part 12, as shown at 22, to form a sealed converter cavity.

An outer impeller shroud is shown at 24. Its outer periphery 26 is welded or otherwise secured to the inner surface of the shell part 12. The inner periphery 28 of the shroud 24 is secured to the portion 14 of the shell part 12.

An inner impeller shroud, shown at 30, includes a radially outward axial extension 32 and a radially inward axial extension 34. Disposed between the shrouds 30 and 24 is a series of impeller blades 36. The inner margins of the blades 36 can be secured to the shroud 30 by means of tabs 38 which are received within cooperating slots formed in the shroud 30. In a similar fashion, tabs 40 are formed on the outer margins of the blades 36 and received through cooperating slots formed in the shroud 24. Tabs 38 and 40 can be bent over tangentially to establish a locked assembly.

A first turbine is identified generally by reference character 42. It includes an inner shroud 44 and an outer shroud 46. Disposed between the shrouds 44 and 46 are turbine blades 48, the outer margins of which are secured by means of tab and slot connections 50 to the shroud 46. The inner margins of the blades 48 are secured to the shroud 44 by means of slot and tab connections 52.

Blades 48 define radial inflow passages that are in fluid communication with the radial outflow passages defined by the impeller blades 36.

The shroud 46 extends radially inwardly as shown at 54. It is secured by means of rivets 56 to a turbine hub 58. This hub is internally splined, as shown at 60, to a central turbine shaft 62. This shaft may extend axially through the torque converter mechanism, as illustrated in Patent #3,083,589, and may be connected to a power input element of a gear arrangement. I contemplate that my improved torque converter mechanism may be used in an automotive vehicle driveline in combination with such a gear arrangement to deliver torque from an internal combustion vehicle engine to the vehicle traction wheels.

The impeller shell part 18 may be connected drivably to the crankshaft for the internal combustion engine in any suitable fashion.

A thrust washer assembly 64 is situated between the hub 58 and the inner portion of the shell part 18. Hub 58 can be journalled within the inner portion of shell part 18 by means of a bushing 66.

A second turbine is identified generally by reference character 68. It includes a shroud 70, which may be cast construction, and integral cast blades 72. These blades form a continuation of flow passages of the blades 48 of the first turbine 42.

Turbine 68 includes a hub 74 which is bolted by means of bolts 76 to a radially extending flange 78 formed on the shroud 70. Hub 74 and the shroud 70 cooperate to define an annular cylinder 80 within which is positioned an annular piston 82. A sealing ring 84 is formed on the inner surface of the cylinder 80 and another sealing ring 86 is formed on the outer peripheral surface of the piston 82. Piston 82 and cylinder 80 cooperate to define a pair of opposed working chambers on either side of the piston 82. The chamber on the left hand side of the piston 82 is in fluid communication with the torous flow cavity of the hydrokinetic unit. The chamber on the right hand side of the piston 82 is in fluid communication with a pressure feed passage 88 which may communicate with the control valve system, not shown. This system can be adapted to supply pressure selectively to the right hand side of the piston 82, thereby causing the piston 82 to shift in a left hand direction against the opposing influence of the circuit pressure. If the passage 88 is exhausted, however, piston 82 assumes a right hand position as shown in the drawing.

Flange 78 and the hub 74 form a plurality of radially extending openings 90 through which shafts 92 extend. One shaft 92 is received within each opening 90 and its inner end is offset to form a crank 93. The end of the crank 93 is received within an annular groove 94 formed on an extension of the piston 82. This groove is defined in part by a ring 96 that is held axially fast upon the piston 82 by means of a snap-ring.

Shafts 92 extend radially outwardly and each of them supports a blade 98. One blade 98 is situated at the fluid flow exit section of each blade 72. As the shaft 92 is adjusted upon movement of the piston 82, the angularity of the blades 98 is changed accordingly. The passages defined by the blades 98 form a continuation of the pasages defined by the blades 72 so that the direction of the flow passing through the turbine 68 can be changed by appropriately changing the angularity of the blades 98. As is explained in Patent #3,083,589, reverse rotation of turbine 68 can be obtained in this fashion.

Hub 74 can be splined or otherwise secured to another turbine shaft 99 which in turn can be connected to a power input element of the gear arrangement.

A thrust washer assembly 100 is situated between the hub 58 and the left hand end of the hub 74.

A torque transfer member is shown at 102. The radially outward margin of member 102 is secured at 104 to the shroud 44 of the turbine 42. It extends radially inwardly and is provided with an internally splined hub 106. This hub in turn can be connected to an externally splined turbine shaft 108 which may be connected to a brake for the purpose of anchoring turbine 42 during reverse drive operation.

The intermediate portion of member 102 is apertured, as shown at 110, so that the torus flow in the converter circuit may pass therethrough with a minimum amount of resistance.

A torque converter stator is identified generally by reference character 112. It includes a series of stator blades 114 situated at the flow entrance region of the blades 36. The extension 34 of the shroud 30 encircles the blades 114 and acts as a stator shroud. A second shroud for the blades 114 is shown at 116. It is formed with an internally splined central opening which receives an externally splined overrunning brake race 120. An overrunning brake inner race 122 can be splined to a stationary stator sleeve shaft shown in part at 124. This in turn may be connected to the transmission housing.

Disposed on either side of the races 120 and 122 are spacer elements 126 and 128. These may be externally splined to the internally splined opening 118. They are held axially fast by means of snap rings, as indicated.

A series of rollers or sprags 130 is situated between the races 120 and 122. If rollers are used, race 120 may be cammed to permit camming action with the rollers. The rollers thereby establish a oneway braking action for the stator blades 114, but permit overrunning motion of the blades 114 in the direction of rotation of the impeller during coupling operation.

Situated at the radially outward flow exit region of the impeller blades is a series of flexible blade elements 132. One blade element 132 is secured to each of the blades 36. As indicated in FIGURE 3, this connection can be established by means of rivets 134.

Elements 132 normally assume the position shown in FIGURE 2 by means of full lines, and they function to direct the torus flow relative to the blades 36 in the direction of the rotation of the impeller. Under high torus flow conditions, however, blade elements 132 are flexed to the dotted line position shown in FIGURE 2. Thus the effective blade exit angle for the blades 36 is altered.

In the embodiment shown, the blade elements 132 are formed with curved cross sectional shapes when viewed along a plane that is transverse to the direction of flow, as indicated in FIGURE 2A to provide a snap action as the elements 132 move from one position to another. The curved configuration of the elements 132 also increases the rigidity of the individual blade elements thereby increasing their resistance to yielding once they have assumed the dotted line position shown in FIGURE 2. The curved configuration of the elements 132, which causes them to assume either one position or the other with a so-called snap action, makes it possible to obtain a definite blade geometry for each of two torque converter performance ranges.

In FIGURE 4 there is shown a vector diagram for a particle of fluid at the exit regions of the impeller, the turbine blades 98 and the stator blades 114. The vector diagrams for cruising conditions, as well as stall, have been illustrated also. The vector $u_0$ represents the component of velocity imparted to a particle of fluid due to the rotation of the impeller. The torus flow in a normal direction at the exit region of the impeller is indicated by the symbol $f_0$. The flow along the blades 36 is illustrated at $w_0$. The vector $v_0$ represents the absolute fluid flow velocity vector and the tangential component of this absolute fluid flow velocity vector is indicated at $s_0$. The angle formed by the blades is designated by the symbol $\gamma$.

The same nomenclature has been used in the vector representation for a particle of fluid at the exit region of the blades 98, although the symbols have been capitalized to differentiate from the symbols used for the impeller. Similarly, corresponding nomenclature is used for the stator exit flow vectors at stall, although primed capital symbols have been employed.

The torque ratio of the torque converter unit, of course, is dependent upon the ratio of the effective turbine torque to the impeller torque. In my disclosed embodiment, I contemplate that the turbines 42 and 68 can be caused to act together so that each of them will provide a positive torque contribution during operation. Since the moment of momentum of a particle of fluid at the entrance region of the blades 42 is equal to the moment of momentum for a corresponding particle of fluid at the exit region of the impeller blades, the effective turbine torque that is developed is determined by the difference in the moment of momentum of a particle of fluid leaving the exit region of the blades 98 and the moment of momentum of a particle of fluid leaving the exit region of the impeller blades 36.

For a particle of fluid with any given mass, therefore, the moment of momentum is determined by the difference in the length of the vectors $s_0$ and $S_0$, and also by the difference in the operating radius of a particle of fluid at the entrance region of the blades 48 and the exit region of the blades 98. But for any given converter design, the difference in the operating radii is constant. To increase the difference in the moment of momentum of a particle of fluid as it passes the bladed turbine passages, it then is desirable to increase the magnitude of the vector $s_0$ to its maximum value since this is the only variable that may be controlled. This is done by employing the flexible blade elements 132.

It will be observed from FIGURE 4 that the angle $\gamma$, under cruising conditions, is substantially less than the angle $\gamma$ under stall conditions. This of course results from the flexure of the blade elements 132. If this angle were not changed, the vector $u_0$ under stall conditions would be substantially less than the length of the vector under cruising conditions that is illustrated in FIGURE 4. The vector $u_0$ under stall conditions increases due to the fact that the size factor of the torque converter unit increases substantially as the effective blade angle at the exit region of he blades 36 decreases. For any given input torque and for any given coupling characteristic, therefore, the effective torque ratio is substantially improved under stall and low speed ratio operating conditions by reason of the automatic variation in the angle provided by the blade elements 132.

Having thus described a preferred embodiment of my invention, what I claim and desire to secure by U.S. Letters Patent is:

1. A hydrokinetic torque converter mechanism comprising a bladed impeller, at least one bladed turbine and a bladed stator situated in toroidal fluid flow relationship in a common torus circuit, said impeller having blades with a fixed section and a yieldable section, the yieldable sections being secured to the flow exit portion of the fixed sections, said yieldable sections being adapted to yield under the influence of hydrokinetic forces applied thereto by the torus flow in said circuit to provide a variable effective impeller blade exit angle, said yieldable blade sections being formed with a curved cross sectional shape as viewed along a plane that is transverse to the direction of flow whereby they are adapted to move tangentially from one position to another with a snap action to provide two distinct performance ranges, one range being characterized by a high torque ratio at each speed ratio in a zone of relatively low speed ratios and the other range being characterized by a relatively low torque ratio at each speed ratio in that same zone, the effective impeller blade exit angle for the impeller being substantially the same as the blade exit angle for the fixed sections during operation in the high torque ratio range, the effective impeller blade exit angle for the impeller being changed during operation in a low torque ratio range so that the tangential component of the absolute fluid flow velocity vector is increased at any speed ratio.

2. A hydrokinetic torque converter mechanism comprising a bladed impeller, at least one bladed turbine and a bladed stator situated in toroidal fluid flow relationship in a common torus circuit, said impeller having blades with a fixed section and a yieldable section, said yieldable sections being secured to the flow exit portion of the fixed sections, said yieldable sections being adapted to yield under the influence of hydrokinetic forces applied thereto by the torus flow in said circuit to provide a variable effective impeller blade exit angle, each yieldable section having an effective blade angle that differs from the corresponding blade angle of its fixed section whereby it is adapted to increase the tangential component of the absolute fluid flow velocity vector relative to the fixed sections in the direction of rotation of the impeller during high speed ratio operation, said yieldable sections being adapted to deflect in a direction opposite to the direction of rotation under the influence of the hydrokinetic pressure of the fluid in said circuit under low speed ratio operating conditions, said yieldable blade sections being formed with a curved cross sectional shape as viewed along a plane that is transverse to the direction of flow whereby they are adapted to move tangentially from one position to another with a snap action.

References Cited in the file of this patent

UNITED STATES PATENTS

| | | |
|---|---|---|
| 2,114,567 | Mercur | Apr. 29, 1938 |
| 2,117,011 | Pratt | May 10, 1938 |
| 2,168,862 | Sensaud de La Vaud | Aug. 8, 1939 |
| 2,351,516 | Jandasek | June 13, 1944 |
| 2,406,499 | Jandasek | Aug. 27, 1946 |
| 2,440,825 | Jandasek | May 4, 1948 |